US005288160A

United States Patent [19]
Li et al.

[11] Patent Number: 5,288,160
[45] Date of Patent: Feb. 22, 1994

[54] AQUEOUS PERMANENT COLORING COMPOSITION

[75] Inventors: Jie Li, Bethlehem; Christine R. Mott, Walnutport, both of Pa.

[73] Assignee: Binney & Smith, Easton, Pa.

[21] Appl. No.: 916,388

[22] Filed: Jul. 20, 1992

Related U.S. Application Data

[63] Continuation-in-part of Ser. No. 702,892, May 20, 1991, Pat. No. 5,131,776, which is a continuation-in-part of Ser. No. 553,156, Jul. 13, 1990, abandoned.

[51] Int. Cl.⁵ ............... B43K 5/00; C03C 17/00; C09D 11/16
[52] U.S. Cl. .................. 401/198; 523/160; 106/19 A; 106/19 F; 106/20 C
[58] Field of Search ............ 106/19 R–20 C, 106/19 A; 523/160; 401/198

[56] References Cited

U.S. PATENT DOCUMENTS

| | | |
|---|---|---|
| 273,240 | 2/1883 | Kendall . |
| 2,427,921 | 9/1947 | Pfaelzer . |
| 2,623,827 | 12/1952 | Moos . |
| 2,772,175 | 11/1956 | Beatty et al. . |
| 2,882,172 | 4/1959 | Scobel . |
| 2,950,285 | 8/1960 | Miller . |
| 2,950,286 | 8/1960 | Miller et al. . |
| 2,966,417 | 12/1960 | Anderson . |
| 2,966,418 | 12/1960 | Anderson . |
| 2,966,419 | 12/1960 | Anderson . |
| 2,966,680 | 12/1960 | Anderson . |
| 3,010,970 | 11/1961 | Fiess . |
| 3,074,800 | 1/1963 | Germann et al. . |
| 3,425,779 | 2/1969 | Fisher . |
| 3,468,679 | 9/1969 | Furlotti . |
| 3,470,200 | 9/1969 | Anderson . |
| 3,470,201 | 9/1969 | Anderson et al. . |
| 3,477,862 | 11/1969 | Forsyth, Jr. . |
| 3,672,842 | 6/1972 | Florin . |
| 3,708,499 | 1/1973 | Andree et al. . |
| 3,870,435 | 3/1975 | Watanabe et al. . |
| 3,875,105 | 4/1975 | Daugherty et al. . |
| 4,028,118 | 6/1977 | Nakasuji et al. . |
| 4,077,727 | 3/1978 | Kramer et al. . |
| 4,077,807 | 3/1978 | Kramer et al. . |
| 4,104,219 | 8/1978 | Peters et al. . |
| 4,108,671 | 8/1978 | Richlin . |
| 4,130,435 | 12/1978 | Hall . |
| 4,156,657 | 5/1979 | Lin . |
| 4,163,675 | 8/1979 | Hirano et al. . |
| 4,213,717 | 7/1980 | Lin . |
| 4,224,071 | 9/1980 | Buell . |
| 4,227,930 | 10/1980 | Lin . |
| 4,329,262 | 5/1982 | Muller . |
| 4,329,264 | 5/1982 | Muller . |
| 4,349,639 | 9/1982 | Muller . |
| 4,357,431 | 11/1982 | Murakami . |
| 4,367,966 | 1/1983 | Williams et al. . |
| 4,407,985 | 10/1983 | Muller . |
| 4,410,643 | 10/1983 | Muller . |

(List continued on next page.)

FOREIGN PATENT DOCUMENTS

| | | |
|---|---|---|
| 61-247774 | 5/1986 | Japan . |
| 63-213583 | 6/1988 | Japan . |
| 1-249867 | 5/1989 | Japan . |
| 1014871 | 4/1983 | South Africa . |

OTHER PUBLICATIONS

Kirk-Othmer Encyclopedia of Chemical Technology, Third Edition, vol. 13, no date given.
1991 American Chemical Society Article entitled "Systems Approach to Rheology Control", Chapter 12 (pp. 207–221), 1991.

*Primary Examiner*—Helene Klemanski
*Assistant Examiner*—Margaret Einsmann
*Attorney, Agent, or Firm*—Leydig, Voit & Mayer Ltd.

[57] ABSTRACT

An aqueous permanent coloring composition includes a pigment, an alkali soluble acrylic resin, a suspending agent, and a volatile pH regulant. The composition optionally includes a drying agent, an adhesion promoter, a color developer and/or a preservative. The composition is useful as a permanent ink or paint and has good fugitivity from skin.

36 Claims, No Drawings

U.S. PATENT DOCUMENTS

| | | | |
|---|---|---|---|
| 4,460,727 | 7/1984 | Shoji . | |
| 4,471,079 | 9/1984 | Enami . | |
| 4,509,982 | 4/1985 | Iijima . | |
| 4,545,818 | 10/1985 | Inoue et al. . | |
| 4,550,660 | 11/1985 | Sato et al. . | |
| 4,557,618 | 12/1985 | Iwata et al. . | |
| 4,569,283 | 2/1986 | Sato et al. . | |
| 4,597,829 | 7/1986 | Sato et al. . | |
| 4,606,769 | 8/1986 | Tanaka et al. . | |
| 4,629,748 | 12/1986 | Miyajima et al. . | |
| 4,648,905 | 3/1987 | Peck et al. . | |
| 4,671,691 | 6/1987 | Case et al. . | |
| 4,687,791 | 8/1987 | Miyajima et al. . | |
| 4,721,739 | 1/1984 | Brenneman et al. . | |
| 4,738,725 | 4/1988 | Daugherty et al. . | |
| 4,760,104 | 7/1988 | Miyajima et al. . | |
| 4,786,198 | 11/1988 | Zgambo | 401/142 |
| 4,789,399 | 12/1988 | Williams et al. . | |
| 4,800,043 | 1/1989 | Allen et al. . | |
| 4,806,272 | 2/1989 | Wiley | 252/511 |
| 4,830,670 | 5/1989 | Danyu . | |
| 4,840,833 | 6/1989 | Iijima . | |
| 4,867,789 | 9/1989 | Eida et al. . | |
| 4,880,465 | 11/1989 | Loria et al. . | |
| 4,904,303 | 2/1990 | Rudolphy et al. . | |
| 4,910,236 | 3/1990 | Foye et al. . | |
| 4,923,515 | 5/1990 | Koike et al. . | |
| 4,952,677 | 8/1990 | Spence et al. . | |
| 4,960,494 | 10/1990 | Chem . | |
| 4,971,628 | 11/1990 | Loftia . | |
| 4,973,499 | 11/1990 | Iwata et al. . | |
| 4,981,516 | 1/1991 | Kluger et al. . | |
| 4,988,123 | 1/1991 | Lin et al. . | |
| 5,009,536 | 4/1991 | Inoue et al. . | |
| 5,013,361 | 5/1991 | Case et al. . | |
| 5,017,224 | 5/1991 | Tomita et al. . | |
| 5,026,427 | 6/1991 | Mitchell et al. . | |
| 5,034,058 | 7/1991 | Akiyama et al. . | |
| 5,043,013 | 8/1991 | Kluger et al. . | |
| 5,048,992 | 9/1991 | Loftin . | |
| 5,049,189 | 9/1991 | Friswell et al. . | |
| 5,062,890 | 11/1991 | Miyashita et al. . | |
| 5,069,719 | 12/1991 | Ono . | |
| 5,085,698 | 2/1992 | Ma et al. | 106/20 |
| 5,151,129 | 9/1992 | Morrison et al. . | |

AQUEOUS PERMANENT COLORING COMPOSITION

This application is a continuation-in-part of prior application Ser. No. 07/702,892, filed May 20, 1991, issued as U.S. Pat. No. 5,131,776 on Jul. 21, 1992, which was a continuation-in-part of prior application Ser. No. 07/553,156 filed Jul. 13, 1990 now abandoned.

BACKGROUND OF THE INVENTION

1. The Field of the Invention

This invention relates generally to the field of inks. In one particular aspect, the invention relates to writing and marking instruments containing liquid inks, and it more specifically relates to the formulation of permanent inks. In one preferred form, the invention relates to improvements in inks for marking instruments for permanent marking.

2. Brief Description of the Prior Art

There are disclosed in the prior art a number of both permanent and non-permanent inks. Inks generally are mixtures of a coloring matter dispersed or dissolved in a carrier fluid. The coloring matter, if readily dissolving in the carrier fluid, is termed a dye. An insoluble coloring material is termed a pigment. Pigments are finely ground solid materials and the nature and amount of pigment contained in an ink determines its color.

Writing and marker inks may also include such ingredients as humectants, biocides, and surfactants. Humectants function to improve freeze/thaw stability and to control drying out of the tip, while biocides serve the obvious function of preventing spoilage of the ink during the expected shelf life of the marker product. In order to limit graininess and/or to enhance the flow characteristics of the ink, a small amount of surfactant is ordinarily employed.

Water based writing and marker inks have traditionally been non-permanent. These prior inks are generally made by a mixture of water and a water soluble dye. While some water based marker inks may have the desirable quality of good skin and textile fugitivity, they also exhibit the undesirable quality of washing off of the writing surface. Water based writing and marker inks also tend to smear during application. After dispensed and dried, such inks are re-wettable and will again smear if later contacted with water. Water based writing and marker inks have also exhibited, at best, a very limited ability to adhere to nonporous surfaces.

Hydrocarbon solvent based writing and marker inks have traditionally been permanent inks. However, along with their desirable permanency, they have had several undesirable qualities. First, the solvent systems utilized in these inks typically include such toxic hydrocarbons as toluene and xylene. Such toxic components may lead to both disposal problems and consumer rejection due to a rising appreciation for the dangers of exposure to toxic chemicals.

Solvent based inks also have a very disagreeable odor due to their hydrocarbon components. Further, solvent based writing and marker inks traditionally are easily smeared and tend to "strike through" paper readily, soaking through the material to which they are applied instead of remaining on the surface. Moreover, solvent based permanent inks are usually difficult to wash from the skin.

A pigmented ink such as disclosed in U.S. Pat. No. 5,131,776 is a marked improvement over previously available inks and incorporates many of the beneficial features of previously available solvent based and water based inks. However, a familiar problem encountered with writing instruments using pigmented inks is that the pigment tends to settle during storage and shipping of the inks and markers using the inks. Pigmented aqueous based inks especially tend to demonstrate this settling while the marker is being stored. Such settling is believed to occur as a result of the low viscosity needed for a marker ink, approximately 1.0–4.5 c.p., and the difference in density between the pigment and the carrier medium, typically water.

Pigment settling may present a problem in a marker using a pigmented ink when the marker is stored either nib-up or nib-down. When a marker containing a pigmented ink is stored nib-down for an extended period of time, the pigment tends to settle into the nib on the writing tip. Such nib-down settling is usually recognized during later use of the marker as increased color intensity of the mark laid down by the marker. If such settling is sufficiently severe, blockage of the nib may occur.

When a marker containing a pigmented ink is stored nib-up for an extended period of time, the pigment tends to leave the nib and settle to the back end of the ink reservoir or transorb. Such settling can be recognized as a loss of color intensity in the mark laid down by the marker. In extreme cases of nib-up settling, the nib actually may appear to dry out.

Apparent from the foregoing is that an ink which has the combination of the desirable qualities of the typical water based, hydrocarbon solvent based, and pigmented inks would be very appealing to the consumer. An even more appealing writing and marker ink would retain these desirable qualities while eliminating the undesirable qualities of lack of toxicity, no "strike through", no disagreeable odors, no pigment settling and good skin fugitivity. In addition, the capability to adhere to nonporous surfaces such as glass, plastic or metals is, in certain applications, another desirable property. Such a writing and marker ink should also work with a variety of marking pen nib types including porous plastic, bonded fiber, composites, felt, extruded plastic and roller balls.

It is therefore a general object of the invention to provide an aqueous based permanent writing and marker ink in which pigment settling is avoided.

It is also an object of the invention to provide a non-toxic permanent writing and marker ink.

A further object of the invention is to provide a permanent writing and marker ink which exhibits little or no "strike through."

Another object of the invention is to provide a permanent writing and marker ink which adheres well to nonporous surfaces.

A still further object of the invention is to provide an odorless, or at least not malodorous, permanent writing and marker ink.

Yet another object of the invention is to provide a permanent writing and marker ink which can be dispensed through a variety of pen nib types.

It is a secondary objective of the invention to provide a permanent writing and marker ink with good skin fugitivity.

These and other objects and advantages of the invention will be apparent to those skilled in this art from the following description of the invention and the appended claims.

SUMMARY OF THE INVENTION

The summary of the present invention is that one may create a writing and marker ink which combines many of the most desirable qualities of both water based writing and marker inks and hydrocarbon solvent based writing and marker inks, while eliminating a great many undesirable qualities of both inks. Thus, the invention is a nontoxic aqueous permanent ink which is suitable for use in writing and marking instruments utilizing a variety of nib types.

The ink of the invention retains such desirable qualities of a water based ink as no toxicity, little or no odor, and good skin fugitivity by washing with soap and water. In addition, the composition of the invention exhibits the desirable qualities of prior hydrocarbon solvent based writing and marker inks of permanence, including resistance to smearing, and resistance to re-wetting after application. This new ink may also be adapted to adhere well to such nonporous surfaces as glass, plastic, or metals. A special improvement over previously described pigmented inks is that the ink of the invention does not exhibit settling of pigment during periods of storage and non-use of the ink or markers utilizing the ink.

While the present invention retains these individual desirable qualities of water based and hydrocarbon solvent based writing and marker inks, the invention eliminates many of the undesirable qualities of previously available inks. Such qualities of water based writing and marker inks as poor adherence to nonporous surfaces and poor resistance to smearing and re-wetting are greatly improved. The undesirable qualities of hydrocarbon solvent based writing and marker inks including disagreeable odors, toxicity, and "strike through" are also eliminated by the present invention. With the removal of toxic chemicals from the ink system, the ink is suitable for use by both children and adults. Also, potential disposal problems associated with disposal of hydrocarbon solvent based inks are eliminated.

In the first respect, the discovery is that an aqueous composition including a pigment, an alkali soluble acrylic resin, a suspending agent and a volatile pH regulant will yield a permanent ink. This ink is especially resistant to water damage when dry and is nontoxic when compared to previously available permanent markers containing such hydrocarbons as toluene and xylene.

Thus, in one form, the invention is an aqueous permanent coloring composition comprising from about 0.1% to about 30% by weight of a pigment; from about 0.1% to about 30% by weight of an alkali soluble acrylic resin; from about 0.05% to about 7% of a suspending agent; and a volatile pH regulant.

Compositions of the invention may optionally further comprise an adhesion promoter, a drying agent, a preservative, a humectant, and a color developer.

Further, a method of preparing an aqueous permanent ink composition is disclosed. The method comprises the steps of forming first a premix by admixing an alkali soluble acrylic resin dispersion with water and adding an amount of a pH regulant sufficient to adjust the pH of the resulting admixture within the range of from about 8 to about 10; forming a second premix by admixing an aqueous pigment dispersion having a mean particle size range of from about 0.05 to about 2 microns with water; admixing the first premix and the second premix forming a first admixture; admixing a suspending agent in the first admixture forming a second admixture; and, admixing water to the second admixture to form the composition. Also, a marking instrument containing an aqueous ink composition and a paint marker containing an aqueous ink is also disclosed.

Understood is that while certain specific aqueous marking compositions containing specific amounts of components are disclosed, compositions such as particular ink, paint, or other compositions having widely differing amounts of these components may be formulated to achieve specific results.

DETAILED DESCRIPTION

The present invention in its most basic form is an aqueous composition having from about 0.1% to about 30% by weight of a pigment; from about 0.1% to about 30% by weight of an alkali soluble acrylic resin; from about 0.05% to about 7% of a suspending agent; and a volatile pH regulant.

As the composition of the invention is dispensed from the writing or marking instrument, the alkali soluble acrylic resin and the pigment form a film. As the ink dries by the evaporation of water and the pH regulant, the pH level of the ink will decrease. Since the alkali soluble acrylic resin is only soluble at an elevated pH, it falls out of the solution and bonds to the surface being marked as the ink dries.

To achieve good coloring of the marker ink and promote compatibility with the remaining ink components, the pigment is utilized in the form of an aqueous dispersion, inasmuch as pigments are by definition insoluble materials. Pigment dispersions are commercially available which are combinations of a pigment, an aqueous based carrier, and a surfactant or dispersant system. A pigment dispersion may also be prepared specifically for use in the ink of the invention. From the standpoint of convenience, a commercial pigment dispersion is preferred for use in the present invention. Typical commercial dispersions contain 30 to 74% by weight active pigment ingredients.

In general, a workable pigment dispersion may have a wide or narrow particle size range depending upon the use to which the ink will be put. The lower limit on pigment particle size is determined not by any functional characteristic of the ink, but by the ability to form a stable dispersion. Similarly, the upper limit on pigment particle size is determined by the type of applicator by which the ink is to be applied or dispensed, since pigment particle size determines the ability of pigment particles to flow through, for example, the matrix of a marker nib. Indeed, relatively larger pigment particles can restrict ink flow through many types of nibs commonly utilized in writing and marking instruments, ultimately rendering them inoperable. Larger particle sizes may, however, may be used where the ink is to be used in, for example, a paint marker, in which the ink or paint composition is dispensed through a valve assembly, or in a roller ball pen. Pigments having a mean particle size range from about 0.05 to about 2.0 microns have been found to work well in compositions of the invention.

In choosing the most suitable pigment particle size, one must be guided by the particular nib type to be utilized in the writing or marking instrument in which the ink will be placed. First, of course, a pigment particle size must be selected which will allow the passage of the composition through the nib being used. Further, the pigment particle size should be selected to promote capillary flow through the particular nib being used in the writing or marking instrument. In general, the size of pigment particles should be kept as low as possible while maintaining the stability of the composition. For example, it has been found that an ink to be utilized in a marking instrument having either a porous plastic nib or a bonded fiber nib, an ultra fine pigment dispersion having a mean particle size in the range of from about 0.05 to about 0.5 microns provides acceptable results. A more preferred ultra fine pigment dispersion for such applications has a mean particle size in the range from about 0.05 to about 0.25 microns, since such a dispersion promotes better wicking or capillary flow through the nib.

The minimum concentration of pigment which will produce a workable ink is governed by the color intensity desired, though as little as 0.1% active pigment may be sufficient for certain applications. The maximum workable concentration of pigment is determined largely by the ability to maintain a stable composition, and can vary widely depending upon the concentration of other components. It is also a function of the characteristics of the desired end product, though a practical upper limit in the formulation of, for example, a marker ink, is about 30% by weight since higher concentrations may cause ink instability and undesirably high viscosity. When a commercial pigment dispersion is utilized, as it preferably is, a practical limit is imposed by the concentration of pigment in the dispersion, which, as previously noted, is typically in the range of about 30% to 74% pigment by the weight of dispersion. The preferred concentration range for most applications is from about 2% to about 10% active pigment by weight of the composition. A concentration of about 5% by weight of active pigment is ordinarily required to ensure good coloration in a typical marker ink and most preferred is a concentration of active pigment in a concentration range of about 6% to about 8% by weight of the composition.

To achieve quality of permanence in the composition of the invention, an alkali soluble acrylic resin is utilized. Acrylic resins are generally polymers or copolymers of acrylic or methacrylic esters, including such materials as styrenated acrylic copolymers, and they are sometimes referred to as acrylic varnish and lacquer resins or as acrylic film forming resins. They are commercially available as substantially pH-neutral dispersions in which the resin is not solubilized to any significant extent. As the pH of a resin dispersion is increased above neutral, the resin will dissolve.

Of principle importance is that a film of the alkali soluble acrylic resin will not re-dissolve upon contact with water unless the pH of the water is elevated to a level which would have been sufficient to dissolve the resin in its original state. Ordinary tap water, rain water, atmospheric condensation, or other commonly present liquids, such as spilled beverages and the like, will, of course, have insufficient alkalinity to re-wet or re-dissolve such resins. However, when ordinary tap water is combined with a soap, the pH of the solution is increased. The increased pH of the soap solution allows the composition of the invention to be readily washed from the skin, thus achieving the objective of good skin fugitivity. Any resin which will perform in this manner is suitable for use in the composition of the invention.

The alkali soluble acrylic resins most useful in the composition of the invention are those having a molecular weight from about 30,000 to about 50,000, though the most suitable molecular weight will be determined by such variables as marking instrument nib type and surface to be marked. These resins typically have glass transition temperatures between 20 and 50 degrees centigrade and, in dispersion, have viscosities between 20 and 100 centipoise. Such resins are commercially available in solutions containing 20% to 50% by weight active resin in an aqueous dispersion.

In the usual case, at least about 0.1% by weight active alkali soluble acrylic resin must be included in the composition in order to form a stable film which gives the composition its quality of permanence. The maximum amount of an alkali soluble acrylic resin to be added to the ink composition is largely determined by the maximum desired viscosity of the ink system. The maximum permissible amount of resin is also a function of the characteristics of the desired end product, though a practical upper limit of active resin in the formulation of, for example, a marker ink, is about 30% by weight of the composition, since higher concentrations may cause undesirably high viscosity. As in the case of commercial pigment dispersions, however, a practical limit is imposed by the concentration of resin in commercially available dispersions. Typically, as just noted, these dispersions contain about 20% to 50% by weight resin. The preferred concentration range for most applications is from about 2% to about 10% active resin by weight of the composition and even more preferred is a concentration of about 4% to about 8% active resin by weight of the composition.

Many commercially available alkali soluble acrylic resins have sufficient resistance to smearing and re-wetting so as to be useful in the present invention. For example, an alkali soluble acrylic resin dispersion manufactured by Union Carbide and sold under the trademark Carboset XL19 ™ which is an acrylic film forming resin will work in the composition of the invention. An acrylic emulsion manufactured by S. C. Johnson and sold under the trademark Joncryl 95 ™ will also work in the composition of the invention. Two acrylic resin dispersions found to work particularly well in the composition of the invention are manufactured by Rohm and Haas and sold under the trademarks Acrysol WS 24 ™ and Acrysol I545 ™.

The ratio of the amount of pigment to the amount of resin in the composition of the invention is generally not critical to the functioning of the composition or to achieving its benefits. However, a large excess of pigment over resin may adversely affect the film-forming capability of the composition. An excess of resin over pigment affects only the degree of coloration of the resulting film.

In one preferred form of the composition of the invention, namely, a marker ink for use with a porous plastic or bonded fiber nib, a 1:1 ratio of active ingredient of pigment and active resin produces good results. For such an ink, the most preferred level of active ingredients is about 6% by weight active ingredient of each of the resin and the pigment.

Inks containing the above described concentrations of pigment and resin have exhibited excellent writing and marking qualities with superior permanency and skin fugitivity attributes. However, writing instruments, including markers, utilizing such inks have exhibited pigment settling during storage, transportation, and other periods of non-use when the writing instruments are in a tip or nib down or a tip or nib up position.

Newly discovered is that the addition of particular suspending agents to the composition appears to eliminate both tip or nib up and tip or nib down settling with very minimal detectable increase in viscosity. Ordinarily, one would anticipate that the use of such a suspending agent would cause a dramatic increase in viscosity as is ordinarily associated with typical suspending agents or thickeners.

Of primary importance as a newly discovered suspending agent for use in marking compositions of the invention are agents which consist of multi-segmented molecules which have an embedded hydrophilic segment and have a hydrophobic segment at each end of the molecule. Most typical of these compounds are molecules having three segments consisting of a hydrophilic center segment with a hydrophobic segment attached to either end of the hydrophilic segment. While these types of compounds have previously been used in preparing latex paint formulations, their use in these formulations has been as primary thickeners to provide flow, leveling, and film build properties while providing spatter resistance to the paints. As previously used in latex paints, these types of compounds build high shear viscosity and have been used to markedly increase the viscosity of paints and to reduce potential problems with viscosity loss due to enzyme attack of latex paints.

These suspending agents are commercially available from several suppliers and three suitable suspending agents for use in compositions of the invention are Pluronic R 25R2 TM, Rohm and Haas RM-5 TM and Rohm and Haas SCT-200 TM. Pluronic R 25R2 is a poly(propylene oxide)-poly(ethylene oxide)-poly(propylene oxide) block copolymer containing about 20 percent by weight of ethylene oxide and has a molecular weight of 3100. Rohm and Haas RM-5 is a water soluble acrylic with a hydrophobic hydrocarbon chain on both ends of the molecule. Rohm and Haas SCT-200 is a somewhat more complex molecule than the three segmented previous two compositions in that it is a hydrophobic polyurethane extended on both ends of the molecule with a hydrophilic poly(ethylene oxide) each of which is in turn capped by a hydrophobic alcohol.

When the suspending agent is added to compositions of the invention in amounts of from about 0.05% to about 7% by weight of the composition, the viscosity of the composition of the invention is maintained at 6 centipoise or less. The marking composition of the invention using such a suspending agent thereby maintains a suitable viscosity for dispensing the composition through various marker nibs. A more preferred concentration of suspending agent is about 0.1% to about 1% by weight of the composition.

While the exact nature of the interaction of the suspending agent with the pigment and alkali soluble acrylic resin is unknown, it is believed that the suspending agent effectively adsorbs onto the surface of the pigment particles forming many loosely associated microgels within the composition. However, this loose association is insufficient to significantly alter the viscosity of the composition.

The particular suspending agent which is selected for use depends to some extent upon the pigment and alkali soluble acrylic resin selected for use in compositions of the invention. While use of any of the described suspending agents inhibit pigment settling, particular combinations of pigment, resin and suspending agent have been found particularly suitable. For example, where a blue pigment dispersion marketed by Sun Chemical under the name Sunsperse BHD 6015 TM was used in combination with an alkali soluble acrylic resin marketed by Rohm & Haas under the name Acrysol WS 24 TM, the suspending agent Rohm and Haas RM-5 TM exhibited excellent suspension characteristics. Where a red pigment dispersion marketed by Sun Chemical under the name Sunsperse RFD 9121 TM was used in combination with an alkali soluble acrylic resin marketed by Rohm and Haas under the name Acrysol WS 24 TM, the suspending agent Pluronic 25R2 TM exhibited excellent suspension characteristics. Where the red pigment Sunsperse RFD 9121 was used in combination with an alkali soluble acrylic resin marketed by Rohm and Haas under the name Acrysol I545 TM, the suspending agent Rohm and Haas SCT-200 TM exhibited excellent suspension characteristics.

A volatile pH regulant is included in the composition to maintain an alkaline pH between about 8.0 and 10.0 so that the alkali soluble acrylic resin remains in solution prior to the ink being dispensed. Upon dispensing the ink, the liquid components of the ink, including the water, the pH regulant, and any drying agent, evaporate, and the pH drops below the solubility of the resin. This allows the composition to form a permanent mark. Any material which is compatible with the other components of the system and which performs this function may be used as a pH regulant. Among the preferred regulants suitable for this composition are ammonium hydroxide and 2-amino-2-methyl-1-propanol.

The volatility of the pH regulant affects the time required for the ink to become water resistant, and the use of a pH regulant which does not have sufficient volatility can produce an ink which might be more easily smeared after application. Thus, in general, a highly volatile pH regulant is preferred for achieving he objects of the invention. The most preferred pH regulant is ammonium hydroxide due to its high volatility.

Additional components may optionally be added to the ink depending on the specific use intended for the ink.

To achieve a more rapid drying rate and to improve marking characteristics upon nonporous materials, a drying agent may be added to increase the overall volatility and therefore the evaporation rate of the water and the pH regulant. Any compatible material which performs this function may be used.

The drying agent preferably should be a volatile polar material so as to ensure compatibility with the primary components of the marker ink. Straight chain C2–C4 alcohols are good, highly volatile drying agents, and of these, ethanol is preferred because of its relatively low cost and because it does not contribute any unpleasant odor to the composition. Alcohols can also provide added benefits, such as reducing surface tension, increasing adherence of the ink to porous surfaces, and providing bactericidal activity when added to the ink composition.

To discourage improper usage of the marker ink, such as ingesting the ink, the alcohol may contain a bittering agent or a conventional denaturant. An alcohol utilizing a bittering agent will discourage such improper usage of the ink by simply imparting a disagreeable taste, while not requiring the use of toxic denaturants as methanol or benzene, and is therefore preferred. A conventional denatured alcohol may, of course, also be utilized. The most preferred drying agent is an ethyl alcohol which contains a bittering agent and which is sold under the trade name SDA 40B ™ and is manufactured by Aaper Alcohol.

When utilized, the drying agent preferably is added from about 5% up to about 30% by weight, with the most preferred concentration being about 8-10% by weight, though these amounts are not critical to the practice of the invention. About 8% per weight of drying agent is ordinarily required to ensure rapid drying of the ink on a nonporous surface, while amounts in excess of about 30% by weight may adversely affect stability of the ink and may cause flocculation of the pigment unless other stabilizing additives are employed.

Another optional component which may be added to compositions of the invention is a color developer. A color developer, when combined with certain pigment dispersions causes marks laid down using inks of the invention to have a brighter and more vivid appearance. Color developers may also be known as color enhancers. Two suitable color developers which may be used in compositions of the invention are Carb-O-Sperse A-205 ™ marketed by Union Carbide and Attagel 50 ™. A-205 ™ is a colloidal fumed silica-aqueous slurry while Attagel 50 ™ is a colloidal suspension of attapulgite clay in water.

In the usual case, from about 0.05% to about 2.0% by weight color developer may be included in compositions of the invention to provide enhancement of color brilliance. Amounts less than 0.05% appear to have little to no effect upon the brilliance of the composition. The maximum amount of color developer which may be added to compositions of the invention is limited by increases in viscosity caused by use of such a solids containing composition and by the lessening of the desired effect at higher color developer concentrations.

Inks to be used to mark on rough or nonporous surfaces may also employ an adhesion promoter to enhance physical attachment of the ink to the material to be marked. Ordinarily, the adhesion promoter is effective when present in amounts of from about 2.0% up to about 5.0% by weight, though this range is by no means critical. Use of greater than about 5% by weight of adhesion promoter may cause the ink to become unstable and cause flocculation of the pigment.

Materials which will serve the function of adhesion promoters are commercially available, and among them are the materials sold under the trademarks Trionic 600 by Petrolite and Jonwax 22 ™ and Jonwax 28 ™ by Johnson Wax. Trionic 600 ™ is a dispersion of clay-treated microcrystalline wax, ethoxylated alcohol C>30, oxidized ethene homopolymer, and ethene homopolymer in water, has been found especially suitable for use in marker ink compositions. Jonwax 22 ™ is a microcrystalline wax emulsion and Jonwax 28 ™ is a also a microcrystalline wax emulsion containing 20-30% wax, 5-10% fatty acid soap, octylphenoxy-polyethoxy ethanol and 50-70% water.

A humectant may optionally be used, for example, to retard the drying out of a writing or marking instrument nib through which the composition of the composition of the invention is to be dispensed. Useful humectants include such products as propylene glycol or glycerine, and numerous other equivalent materials are well known in this art. The humectant may advantageously be added in amounts from 2% up to about 20% by weight, though this range is by no means critical. The amount of humectant to be added is determined by the type of nib used in the writing or marking instrument and the protection time period desired.

To maintain the shelf life of the composition, a preservative may be added. The preservative preferably serves as both a bactericide and a fungicide, and is added in any effective amount, though a typical concentration range is from about 0.1% up to about 5.0% by weight. The use of preservatives in levels greater than about 5% by weight may cause the ink to become toxic or unstable and may, in any event, be unnecessary. Should alcohol be added to the composition as a drying agent, that alcohol will function as a preservative to some extent also.

Any conventional preservative may be utilized in the invention as long as there is compatibility with the remaining ink components. For example, preservatives manufactured by Dow Chemical Co. and sold under the trademarks Dowicil 75 (1-(3-chloroallyl)-3,5,7-triaza-1-azoniaadamantane chloride) and Dowacil 200 ™ (3-chlorovinylhexamethylene tetrammonium chloride) or a preservative manufactured by Rohm and Haas and sold under the trademark Kathon PFM ™ (isothiazolinones), or a preservative manufactured by Sutton Labs and sold under the trademark Germall II ™ (imazolidinyl urea), or a preservative manufactured by Merck and sold under the trademark Tektamer 38 ™ (1,2 dibromo-2,4-dicyanobutane), will work in the composition of the invention.

EXAMPLES

In formulating the compositions of the present invention, a first premix is formed by mixing the alkali soluble acrylic resin with water. Generally, this mixture is about 50% by weight commercially available resin and 50% by weight water. The pH regulant is then added until a pH of between about 8.0 and about 10.0 is achieved. At this pH, the resin will dissolve into the solution.

A second premix is then formed by adding the pigment dispersion to approximately 33% of the required total water. The first premix is then combined with the second premix, the suspending agent is added and the solution is mixed. Following mixing, the remaining required water is then added and then any additional components such as an adhesion promoter, drying agent, or preservative are added. While the order of addition is not critical to the formulation of a workable composition, greater stability is generally achieved when the first (resin) premix is added to the second (pigment) premix.

The following are formulated as examples of the composition of the invention and related control examples which do not contain a suspending agent.

| Component | wt % | wt % |
|---|---|---|
| | Example 1 Blue Ink | Example 2 Blue Ink |
| Deionized water | 55.3 | 53.8 |
| Acrysol WS-24 (36% dispersion) | 18.0 | 18.1 |
| 14% NH₄OH | 0.7 | 0.7 |
| Sun Pigment Dispersion BHD 6015 (51-55%) | 13.4 | 13.3 |
| Suspending Agent Rohm & Haas RM-5 | 0.5 | 0 |
| Adhesion Promoter Trionic 600 | 4.0 | 4.0 |
| Drying Agent SDA-40B | 8.0 | 10.0 |
| Preservative Kathon PFM | 0.1 | 0.1 |

-continued

| Component | wt % | wt % |
|---|---|---|
| | Example 3 Red Ink A | Example 4 Red Ink A |
| Deionized water | 52.9 | 58.3 |
| Acrysol WS-24 (36% dispersion) | 18.0 | 16.0 |
| 14% NH$_4$OH | 0.7 | 0.6 |
| Sun Pigment Dispersion RFD 9121 (38-42%) | 19.0 | 16.0 |
| Suspending Agent Pluronic R 25R2 | 0.3 | 0 |
| Color Developer A-205 | 1.0 | 1.0 |
| Humectant Propylene glycol | 4.0 | 4.0 |
| Adhesion Promoter Trionic 600 | 4.0 | 4.0 |
| Preservative Kathon PFM | 0.1 | 0.1 |
| | Example 5 Red Ink B | Example 6 Red Ink B |
| Deionized water | 58.0 | 58.3 |
| Acrysol I545 (39.5% dispersion) | 15.0 | 16.0 |
| 14% NH$_4$OH | 0.6 | 0.6 |
| Sun Pigment Dispersion RFD 9121 (38-42%) | 18.0 | 18.0 |
| Suspending Agent SCT-205 | 0.3 | 0 |
| Color Developer A-205 | 1.0 | 1.0 |
| Humectant Propylene glycol | 3.0 | 3.0 |
| Adhesion Promoter Jonwax 28 | 4.0 | 4.0 |
| Preservative Kathon PFM | 0.1 | 0.1 |

The inks of examples 1-6 had acceptable working properties. For examples 1 through 6, the pH ranged from 8.1 to 8.7 and the density ranged from 8.3 to 8.7 pounds per gallon. The surface tension for examples 1 through 6 ranged from 33 to 37 dynes/cm. For examples 1, 3 and 5, the viscosity ranged from 4.4 to 4.7 centipoise, and for examples 2, 4 and 6, the viscosity ranged from 3.6 to 3.9 centipoise.

Evaluation of Examples 1-6

Longer term testing of the inks for evaluation of pigment settling in a marker having a polyester fiber nib was then conducted. Ink from each example was divided and placed into two indentical markers having polyester fiber nibs. A mark was then made with each of the markers on a piece of 20 pound white bond paper. One of each pair of markers was then stored in a nib-down position with the marker cap attached and the second marker of each pair was stored in a nib up position with the marker cap attached.

Following a period of storage, a second mark on paper was made with each marker and the mark and operation of the marker was compared with that made prior to storage. Chart I details the results of these tests.

CHART I

| Example | Time Stored | Comments |
|---|---|---|
| 1 Nib Up | 1 month | Mark was equal in color and intensity to mark made prior to storage |
| 1 Nib Down | 1 month | Mark was equal in color and intensity to mark made prior to storage |

CHART I -continued

| Example | Time Stored | Comments |
|---|---|---|
| 2 Nib Up | 1 week | Mark was equal in color and intensity to mark made prior to storage |
| 2 Nib Down | 1 week | Mark was darker in color than mark made prior to storage and nib was partially clogged |
| 3 Nib Up | 1 month | Mark was equal in color and intensity to mark made prior to storage |
| 3 Nib Down | 1 month | Mark was equal in color and intensity to mark made prior to storage |
| 4 Nib Up | 1 week | Mark was lighter in color and intensity than mark made prior to storage |
| 4 Nib Down | 1 week | Mark was darker in color and intensity than mark made prior to storage and nib was dryer |
| 5 Nib Up | 1 month | Mark was equal in color and intensity to mark made prior to storage |
| 5 Nib Down | 1 month | Mark was equal in color and intensity to mark made prior to storage |
| 6 Nib Up | 1 week | Mark was lighter in color and intensity than mark made prior to storage |
| 6 Nib Down | 1 week | Mark was darker in color and intensity than mark made prior to storage and nib was dryer |

From the above examples, one may readily see that the improved marking composition of the invention including a suspending agent provided markedly improved storagability of writing instruments containing the composition of the inventions.

The composition of Examples 1-6 were evaluated for water resistance using both 20 pound bond paper and glossy facsimile paper. Marks were streaked across each sheet of paper in one pass. The mark was allowed to dry for one hour. Two thirds of the mark was then immersed in a water bath for ten minutes. Each mark from each example composition was then examined for water resistance. An ink was deemed to have acceptable water resistance if it met both of these criteria: (1) the mark did not show a marked change in color or shade, and (2) the mark did not feather or disperse. None of the marks exhibited unacceptable changes in color or shade and none of the marks feathered or dispersed. All of the marks were judged acceptable.

A wet and dry adhesion test was also run on various other surfaces including glass, aluminum foil, brown craft paper, and a polyethylene sheet. Marks were streaked across the surface in one pass using a marker containing the ink using a bonded polyester fiber nib. The mark was allowed to dry for five minutes. An attempt was then made to remove the mark with both a dry paper towel (dry) and a paper towel wetted with tap water (wet).

The adhesion of the mark to the surface was then graded with a value between 0 and 100 with 100 being no removal and 0 being total removal. Moderate pressure was applied to the mark with the dry and the wet paper towels.

| | Adhesion Test | | | | | | | |
|---|---|---|---|---|---|---|---|---|
| | Glass | | Brown Craft Paper | | Polyethylene Sheet | | Aluminum Foil | |
| Example | Dry | Wet | Dry | Wet | Dry | Wet | Dry | Wet |
| Example 1 | 100 | 25 | 100 | 78 | 100 | 28 | 100 | 12 |
| Example 2 | 100 | 60 | 100 | 76 | 100 | 24 | 100 | 12 |
| Example 3 | 100 | 60 | 100 | 98 | 100 | 100 | 100 | 100 |
| Example 4 | 100 | 28 | 100 | 100 | 100 | 100 | 100 | 100 |
| Example 5 | 100 | 40 | 100 | 80 | 100 | 80 | 100 | 100 |
| Example 6 | 100 | 100 | 100 | 90 | 100 | 60 | 100 | 100 |

Examples 7 and 8

An ink of the invention may also be used in a paint marker which utilizes a valve assembly for ink dispensing. The ink of example 7 is prepared in the same manner as the previous inks as is the ink of example 8.

| Component | wt % | wt % |
|---|---|---|
| | Example 7 Blue Ink | Example 8 Blue Ink |
| Acrysol WS-24 (36% dispersion) | 28 | 28 |
| SDA 40B Alcohol | 10 | 12 |
| Deionized Water | 38 | 35 |
| 28% NH₄OH | 2 | 2 |
| Sun Pigment Dispersion BHD 6015 (51–55%) | 22 | 22 |
| Suspending Agent RM-5 | 0 | 0.5 |
| Kathon PFM | <1 | <1 |

From the foregoing description and examples, it is apparent that the objects of the present invention have been achieved. The aqueous permanent pigment ink provides a permanent marking ink which is nontoxic, exhibits good skin fugitivity, has little or no odor, and exhibits minimal paper "strike through," while toxic chemicals found in prior permanent inks such as toluene and xylene are eliminated. Additionally, pigment settling during storage of writing instruments using the composition of the invention has been eliminated.

While only certain embodiments have been set forth, alternative embodiments and various modifications will be apparent to those skilled in the art. These and other alternatives are considered equivalents and within the spirit and scope of the present invention.

What is claimed is:

1. An aqueous permanent coloring composition comprising:
   (a) from about 0.1% to about 30% by weight of a pigment;
   (b) from about 0.1% to about 30% by weight of an alkali soluble acrylic resin;
   (c) from about 0.05% to about 7% of a suspending agent, wherein said suspending agent is formed by a molecule having a first end and a second end and having an embedded hydrophilic segment and a hydrophobic segment attached at each of said first end and said second end; and
   (d) a volatile pH regulant,
   said composition having a pH from about 8 to about 10, and said composition having a viscosity of about six centipoise or less.

2. A composition according to claim 1, wherein said pigment is present in an amount of from about 2% to about 10% by weight.

3. A composition according to claim 2, wherein said pigment is present in an amount of from about 6% to about 8% by weight.

4. A composition according to claim 1, wherein said alkali soluble acrylic resin is present in an amount of from about 2% to about 10% by weight.

5. A composition according to claim 4, wherein said alkali soluble acrylic resin is present in an amount of from about 4% to about 8% by weight.

6. A composition according to claim 1, wherein said suspending agent is present in an amount of from about 0.1% to about 3% by weight.

7. A composition according to claim 6, wherein said suspending agent is present in an amount of from about 0.1% to about 1% by weight.

8. A composition according to claim 1, wherein said suspending agent is selected from the group consisting of hydrophobically modified poly(ethylene oxide) and hydrophobically modified water soluble acrylic.

9. A composition according to claim 1, wherein said pigment has a mean particle size range from about 0.05 to about 2.0 microns.

10. A composition according to claim 9, wherein said pigment comprises pigment particles having a mean particle range of from about 0.05 to 0.50 microns.

11. A composition according to claim 1, wherein said alkali soluble acrylic resin has a molecular weight of from about 30,000 to about 50,000.

12. A composition according to claim 1, wherein said pH regulant is selected from the group consisting of ammonium hydroxide and 2-amino-2-methyl-1-propanol.

13. A composition according to claim 1, said composition further comprising an adhesion promoter.

14. A composition according to claim 13, wherein said adhesion promoter is present in amount of from about 2.0% to about 5.0 by weight.

15. A composition according to claim 13, wherein said adhesion promoter comprises a hydrocarbon polymer emulsion.

16. A composition according to claim 1, said composition further comprising a drying agent.

17. A composition according to claim 16, wherein said drying agent is an alcohol.

18. A composition according to claim 17, wherein said alcohol is a C2–C4 straight chain alcohol.

19. A composition according to claim 17, wherein said alcohol contains a bittering agent.

20. A composition according to claim 17, wherein said alcohol is a denatured alcohol.

21. A composition according to claim 17, wherein said alcohol is present in an amount of from about 5% to about 30% by weight.

22. A composition according to claim 21, wherein said alcohol is present in an amount of from about 8% to about 10% by weight.

23. A composition according to claim 1, said composition further comprising a preservative.

24. A composition according to claim 23, wherein said preservative is present in an amount from about 0.1% to about 5.0% by weight.

25. A composition according to claim 1, said composition further comprising a humectant.

26. A composition according to claim 25, wherein said humectant is present in an amount of from about 2% up to about 20% by weight.

27. A composition according to claim 1, said composition further comprising a color developer.

28. A composition according to claim 27, wherein said color developer is present in an amount of from about 0.05% to about 2.0% by weight.

29. An aqueous permanent coloring composition comprising:
(a) from about 2% to about 10% by weight of a pigment having a mean particle size range from about 0.05 to about 0.5 microns;
(b) from about 2% to about 10% by weight of an alkali soluble acrylic resin;
(c) from about 0.1% to about 3% of a suspending agent, said suspending agent being formed by a molecule having a first end and a second end and having an embedded hydrophilic segment and a hydrophobic segment attached at each of said first end and said second end; and
(d) a volatile pH regulant,
said composition having a pH from about 8 to about 10.

30. An aqueous permanent coloring composition comprising:
(a) from about 6% to about 8% by weight of a pigment having a mean particle size range from about 0.05 to about 0.5 microns;
(b) from about 4% to about 8% b weight of an alkali soluble acrylic resin;
(c) from about 0.1% to about 1% of a suspending agent, said suspending agent being formed by a molecule having a first end and a second end and having an embedded hydrophilic segment and a hydrophobic segment attached at each of said first end and said second end;
(d) from about 2% to about 5% of an adhesion promoter;
(e) optionally from about 0.05% to about 2% of a color developer;
(f) from about 8% to about 10% of a drying agent; and
(g) a volatile pH regulant,
said composition having a pH of from about 8 to about 10, and said composition having a viscosity of about six centipoise or less.

31. A method of preparing an aqueous permanent ink composition comprising the steps of:
(a) forming a first premix by admixing an alkali soluble acrylic resin dispersion with water and adding an amount of a pH regulant sufficient to adjust the pH of the resulting admixture within the range of from about 8 to about 10,
(b) forming a second premix by admixing an aqueous pigment dispersion having a mean particle size range of from about 0.05 to about 2 microns with water;
(c) admixing said first premix and said second premix forming a first admixture;
(d) admixing a suspending agent in said first admixture of said first premix and said second premix forming a second admixture;
(e) admixing water to said second admixture to form said composition.

32. A marking instrument containing an aqueous coloring composition, said composition comprising:
(a) from about 0.1% to about 30% by weight of a pigment having a mean particle size range from about 0.05 to about 2.0 microns;
(b) from about 0.1% to about 30% by weight of an alkali soluble acrylic resin;
(c) from about 0.05% to about 7% of a suspending agent, wherein said suspending agent is formed by a molecule having a first end and a second end and having an embedded hydrophilic segment and a hydrophobic segment attached at each of said first end and said second end; and
(d) a volatile pH regulant,
said composition having a pH from about 8 to about 10, and said composition having a viscosity of about six centipoise or less.

33. A marking instrument according to claim 32, wherein said marking instrument has a porous plastic or bonded fiber nib.

34. A marking instrument according to claim 32, wherein said alkali soluble acrylic resin has a molecular weight of at least about 30,000.

35. A marking instrument according to claim 34, wherein said acrylic resin has a molecular weight of from about 30,000 to about 50,000.

36. An aqueous permanent coloring composition comprising:
(a) from about 0.1% to about 30% by weight of a pigment;
(b) from about 0.1% to about 30% by weight of an alkali soluble acrylic resin;
(c) from about 0.05% to about 7% of hydrophobically modified polyurethane; and
(d) a volatile pH regulant,
said composition having a Ph from about 8 to about 10, and said composition having a viscosity of about six centipoise or less.

* * * * *

UNITED STATES PATENT AND TRADEMARK OFFICE
CERTIFICATE OF CORRECTION

PATENT NO. : 5,288,160
DATED : FEBRUARY 22, 1994
INVENTOR(S) : JIE LI AND CHRISTINE R. MOTT

It is certified that error appears in the above-identified patent and that said Letters Patent is hereby corrected as shown below:

Column 8, line 35, after "achieving" delete, "he" and substitute therefor -- the --;

Column 10, line 53, as a title to the table, insert -- Examples 1-6 --;

Column 11, second table, Example 5 & 6, line 8, delete "SCT-205" and substitute therefor -- SCT 200 --; and Column 13, line 9, as "Example 3" delete "Exampls" and substitute therefor -- Example --.

Column 15, line 25, after "8% b" add -- y --; and

Column 16, line 47, delete "Ph" and substitute therefor -- pH --.

Signed and Sealed this

Third Day of January, 1995

Attest:

BRUCE LEHMAN

Attesting Officer

Commissioner of Patents and Trademarks